Patented Nov. 14, 1939

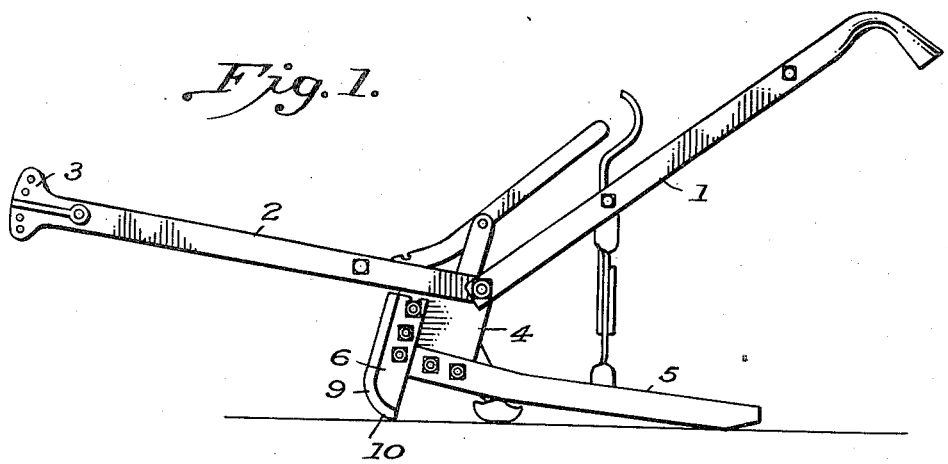
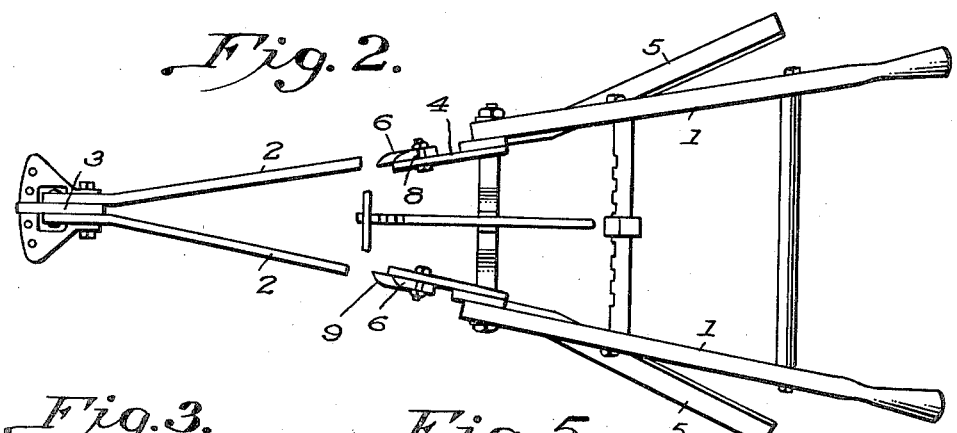
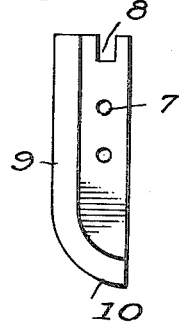
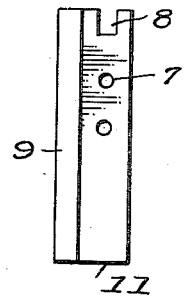
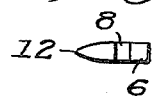
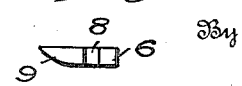

2,179,596

UNITED STATES PATENT OFFICE 2,179,596

ATTACHMENT FOR CULTIVATORS

Andrew Jackson Meeks, Nicholls, Ga.

Application November 7, 1938, Serial No. 239,344

1 Claim. (Cl. 97—171)

This invention relates to certain new and useful improvements in an attachment for a cultivator and deals particularly with a type of structure that is simple in construction yet very efficient in its operation, durable, and easily applied to or removed from the cultivator frame whenever desired.

The main object of the invention resides in the provision of a bladed member which may be readily fixed into position on the cultivator for the purpose of barring-off and treating the soil along the sides of the rows of growing crops.

Another object of the invention is the provision of a cutter which acts in conjunction with the side sweeps or spreader blades so that the cut grasses and weeds are directed away from the growing crops.

Still another object of the invention resides in the provision of a cutting attachment which can be fixed into position on the cultivator by the same nuts and bolts that are used in securing the plowshare into position.

These and other objects will readily present themselves to those skilled in the art when the following specification is read in connection with the attached drawing, wherein similar reference numerals indicate like parts throughout the several views, in which Figure 1 is a side view of a cultivator with the cutting blades applied thereto;

Figure 2 is a plan view of the cultivator;

Figure 3 is a side view of one of the cutter blades, with the lower edge thereof in rounded formation;

Figure 4 is a top view of the blade shown in Figure 3;

Figure 5 is a side view of a modified type of blade, with a straight lower edge;

Figure 6 is a top view of the blade shown in Figure 5; and

Figure 7 is a top view of a blade having a double bevelled cutting edge.

Referring more in detail to the drawing, 1—1 indicates the handle bars by which the cultivator is guided in its movement. These handle bars 1—1 are attached at their lower ends to the draw bars 2—2, which latter gradually approach each other at the forward portion of the cultivator and have attached at their front ends a clevis 3, forming a coupling to which power may be applied to pull the cultivator.

Secured in any appropriate manner to the draw bars 2—2 and extending downwardly therefrom are frame plates 4—4. These plate members 4—4 form the supporting means to which any one of the cultivator attachments may be applied; but as applicant is interested particularly in a weeding attachment, specific reference thereto will be made.

Extending rearwardly and flaring outwardly towards their rear ends is a pair of spreader blades 5—5 secured by means of suitable nuts and bolts or the like to the lower horizontal edge of the frame plates 4—4. The frame plates 4—4 have a series of openings along their forward vertical edges for the reception of fastening bolts, by which various types of attachments may be affixed in position on said plates. In the present instance, a weeding tool in the form of a cutting blade 6 is provided having bolt openings corresponding to the spacing of the bolt openings on the forward edges of the frame plates 4—4. As shown in the drawing, the blade 6 has bolt holes 7 and a slotted opening 8, the latter being arranged to straddle the shank of the uppermost bolt fastening in the plate member 4.

The forward edge of the cutting blade 6, as shown in Figures 3 and 5, is bevelled to one side, as suggested by the reference character 9. The lower portion of the blade 6 may be curved, as shown at 10 in Figure 3, or may be of a straight-edge formation, if desired, as shown at 11 in Figure 5.

In Figure 7 there is suggested a slight modification of the cutting edge of the blade member 6, wherein the edge is formed by a double bevel, as at 12, in lieu of the single bevel 9 as shown in Figures 4 and 6.

After the ground has been suitably prepared and the crops start sprouting, it is generally the custom to cut and remove all foreign growths, such as weeds and grasses, from both sides of the drill or row. To do this effectively, the cultivator, which is of the straddle-row type, is provided with plate members 4—4 depending downwardly and on both sides of the row.

Each of the plate members provided with the cultivator, as just referred to, has therein a series of aligned openings for the reception of fastening bolts. Each of the cutting blades 6 also has a series of bolt openings corresponding or registering with the openings in the plate members. These blades are securely fastened to the plate members by bolts or the like, as suggested in the drawing. The actual cutting or severing of the undesirable growth is accomplished in the present invention by use of the blades 6—6, and the removal of the cut growth from the immediate vicinity of the growing plants is attended to by the diverging spreader blades 5—5. The cut weeds, grasses, and the like are neatly piled in rows between the growing plants.

What I claim as new and desire to secure by Letters Patent of the United States is:

A cultivator, having a frame, a plate secured to the frame, said plate having a series of bolt openings therein to permit the attachment thereto of a plurality of implements, in combination with a flat bladed member having a vertically extending cutting edge along its forward face, the lower portion of said cutting edge being rounded to gradually approach and finally terminate at the rear face of the blade, said blade being provided with a series of bolt openings corresponding to the openings in the plate to permit the attachment of said bladed member to the plate.

ANDREW JACKSON MEEKS.